United States Patent [19]

Hallenbeck

[11] 4,329,265

[45] * May 11, 1982

[54] OUTSIDE TIRE PAINT

[75] Inventor: Victor L. Hallenbeck, Brecksville, Ohio

[73] Assignee: The B. F. Goodrich Company, Akron, Ohio

[*] Notice: The portion of the term of this patent subsequent to Apr. 2, 1999, has been disclaimed.

[21] Appl. No.: 136,006

[22] Filed: Mar. 31, 1980

[51] Int. Cl.³ ............................................. C08L 91/00
[52] U.S. Cl. ................................... 524/496; 260/718; 260/745; 524/487
[58] Field of Search .................. 260/28.5 B, 718, 745, 260/23.7 N, 23.7 M

[56] References Cited

U.S. PATENT DOCUMENTS 3,644,130  2/1972  Evans et al. .................. 260/28.5 B
3,923,712  12/1975  Vickery .......................... 260/28.5 B

*Primary Examiner*—Melvyn I. Marquis
*Attorney, Agent, or Firm*—Joe A. Powell

[57] ABSTRACT

An outside green tire paint is provided which is a water based paint. The paint is substantially free of silicone and hydrocarbon solvents. The paint compositions comprise (a) rubber latex, (b) wax dispersion, (c) carbon black, (d) water and (e) a surfactant.

5 Claims, No Drawings

OUTSIDE TIRE PAINT

BACKGROUND OF THE INVENTION

Pneumatic tires are assembled on a building drum from unvulcanized rubber and fabric. The tires are then vulcanized in a metal mold to form the familiar shape of a finished tire. To facilitate the molding operation, the uncured or "green" tires are coated prior to molding with what is commonly referred to as an outside green tire paint.

The outside green tire paints serve the functions of allowing the rubber to slip as it comes in contact with the metal mold and the paints also serve as a release agent when at the end of the vulcanization cycle, the tire must separate from the mold. Another function of the paint is to provide air bleeding of air which becomes trapped between the tire and the mold. Outside green tire paints also aid in the appearance of the finished tire.

The outside green tire paints used heretofore are solvent based. That is they use a hydrocarbon solvent such as gasoline as a carrier. This hydrocarbon solvent when applied to the outside of a green tire will evaporate into the atmosphere thus leading to pollution of the atmosphere with organic vapors. Air scrubbing equipment would need to be installed to prevent air contamination with organic vapors. Also allowing the solvents to evaporate is a tremendous waste of our natural resources.

Another common ingredient in the prior art paints is silicone. Silicone is used to provide the slip needed when the tire slides into the mold. Silicone provides the required slip very well, however, it also can lead to tire defects. Splice areas where tire components are put together are especially vulnerable to interference by silicone. Two particular problem areas are the tread splice and the liner splice. If either of these splice areas have the slightest opening, silicone can become present in the opening and not allow the rubber to self-adhere during the vulcanizing process. U.S. Pat. No. 3,507,247 discloses a typical prior art outside green tire paint together with an apparatus for applying said paint. It would be desirable to have an outside green tire paint which was free of both hydrocarbon solvents and silicones.

SUMMARY OF THE INVENTION

It is an object of the present invention to provide an effective outside green tire paint.

It is a further object of the present invention to provide a green tire paint composition which does not contain silicone or a hydrocarbon solvent.

These and other objects, which will become evident, from the subsequent description, are achieved by employing as an outside green tire paint a composition comprising (a) rubber latex, (b) wax dispersion, (c) carbon black, (d) water, and (c) surfactant.

DETAILED DESCRIPTION

The first necessary ingredient of the novel outside green tire paint is a rubber latex. The rubber latex serves the purpose of reducing flaking of the paint from the cured and uncured tire. The rubber latex acts as a binder which keeps the paint on the tire. Paint flaking causes a buildup of paint to occur in the mold thus resulting in increased frequency of mold cleaning and in severe cases, defective tires.

The types of rubber latex used can vary, however, natural rubber latex is preferred with styrene butadiene latex next preferred. Other types of rubber latex or a blend of more than one latex may be used.

The second necessary ingredient of the outside green tire paint of this invention is a wax dispersion. The wax dispersion serves the function of providing slip. The tire can slip and change its position as it is being positioned in the mold. Prior art paints use silicone to provide slip. Wax, being more compatible with rubber than silicone, does not interfere with sidewall and tread splice adhesion as does silicone.

The type and amount of wax used in the wax dispersion is important for making a satisfactory outside green tire paint. Paraffin wax, because of its compatibility with rubber is a particularly desirable wax. A paraffin wax with a 55° C. melting point gave excellent results in the paint of this invention. A blend of more than one wax may be used in this invention.

In addition to the wax, the wax dispersion contains water, a dispersing system such as soap and surfactant. Although commercially available soaps may be used to make the wax dispersion, it has been found that the soap can be made in situ by using a fatty acid such as oleic, stearic, or lauric acid and the like and an amine such as monoethanolamine.

The third necessary ingredient of the outside green tire paint of this invention is carbon black. Carbon black serves the function of acting as an air bleeding agent. The carbon black allows the air that becomes trapped between the tire and the mold to escape. Carbon black is also beneficial because it imparts a black shine to the outside of the tire, thereby improving its appearance. The types of carbon black suitable for use in this invention are those which are normally referred to as ink type blacks. Large particle size, nonpellatized blocks such as those with a particle size greater than 50 millimicrons are preferred for use in this invention. Examples of a preferred carbon black are those with ASTM designation N900, and the like.

The paints also may contain a neutralizing agent. The purpose of the neutralizing agent is to neutralize any acidity that the carbon black may have. If the carbon black is neutralized, the stability of the paint is much improved. Although the neutralizing agent is not a necessary ingredient, it offers significant advantages by improving paint stability. Excellent results were obtained when dilute ammonium hydroxide was used as the neutralizing agent.

It is also preferred to use an antifoam agent to decrease the foaming as the paint is being mixed.

The outside green tire paints of this invention also contain water as the carrier. Water is present in the rubber latex, wax dispersion, ammonium hydroxide and as free water added. The prior art paints commonly use hydrocarbon solvents such as gasoline as the carrier. By using water based paint, harmful vapors are eliminated and precious natural resources are conserved. The paints of this invention also contain a surfactant to aid in dispersing the ingredients in water.

The paints of this invention are sprayable. Spraying is the preferred method of application of the paints to the outside surface of the tire. The paints of this invention are stable in that they can be stored for long periods of time before being used. If settling occurs, then a minimum of stirring is required to resuspend the ingredients.

The quantities of the ingredients of the paint may be varied to give a paint with the desirable solids content.

A solids content of from about 20 to about 30 percent has been found to be particularly desirable. Other solids content levels could be used depending on the application method and equipment.

The paints of this invention are easily produced by first making the wax dispersion. The wax dispersion is made by melting the wax. Once the wax is melted, it is placed under strong agitation. The fatty acid is then added to the molten wax. The amine is added next along with ½ of the surfactant. Meantime, the water is heated to about the same temperature as the molten wax and the hot water is added rapidly to the molten wax mixture. A hot wax dispersion will immediately form. The remaining surfactant is then added and the dispersion is cooled under steady agitation to form a stable wax dispersion. To form the paint, water is placed under agitation and the ingredients are added in the order of surfactant, dilute ammonium hydroxide, carbon black, antifoam agent, wax dispersion, and rubber latex.

The paints of this invention may contain other nonessential ingredients for identification purposes. The addition of nonessential ingredients for various purposes will become evident to those skilled in the art without departing from the scope of this invention.

In order to further illustrate the present invention, the following Example is presented.

EXAMPLE

This Example demonstrates a paint having 25% solids. An outside green tire paint according to this invention was made by first making the wax dispersion. The wax dispersion composition used was as follows:

| INGREDIENT | LBS. WEIGHT |
|---|---|
| Paraffin Wax (55° C. M.P.) | 100.00 |
| Oleic Acid | 20.00 |
| Morpholine | 6.40 |
| Surfactant (Triton × 100) | 1.80 |
| Water | 234.00 |

The wax was placed in a pot and heated to 70° C. When the wax had melted, it was placed under strong agitation. The oleic acid was added to the molten wax. Morpholine was then added at this point. Meantime, the water was heated to 70° C. in a separate container. The hot water was then added rapidly to the molten wax mixture. A hot wax dispersion immediately formed. The remaining surfactant was then added. The hot wax dispersion was maintained under steady agitation while cooling to ambient temperature. A stable wax dispersion was obtained.

The paint was made having the following formula:

| INGREDIENT | LBS. WEIGHT |
|---|---|
| Water | 273 |
| Surfactant (Triton × 100) | 14 |
| NH₄OH dilute (15%) | 10 |
| N900 Carbon Black | 53 |
| Natural Rubber Latex (62.2%) | 42 |
| Wax Dispersion (35.4%) | 48 |
| Antifoam Agent | — |

The procedure followed to prepare the above paint was to first place the water under agitation. The remainder of the ingredients were added in the order of surfactant, dilute ammonium hydroxide, carbon black, antifoam agent, wax dispersion, and rubber latex.

The above paint was evaluated as an outside green tire paint by coating the outside of several thousand tires. The tires were cured and there were no defects which were related to the paint. A sample of the tires were subjected to typical tire tests and the results show that the tire performance of tires painted with the paint of this invention were equivalent to tires painted with prior art paints.

Tires utilizing the paint of this invention had less incidence of tread and sidewall splice interference. This improvement is especially important when tires are made with the tread over sidewall building procedure. The tread over sidewall procedure results in a junction line running the circumference of the tire in the upper sidewall of the tire. Prior art paints containing silicone tend to contaminate this junction, thus not allowing the rubber to knit together. The nonsilicone paints of this invention are more compatible with the rubber and therefore splice or junction interference is much less than the prior art paints.

In practicing this invention, those skilled in the art may make minor variations in the disclosed novel outside green tire paint without departing from the scope of this invention. Therefore, it is intended that the scope of this invention be limited only by the following claims.

I claim:
1. An outside tire painting comprising
   a. at least one rubber latex, wherein said latex is selected from the group consisting of natural rubber latex and styrene butadiene latex,
   b. a wax dispersion containing paraffin wax,
   c. nonpelletized carbon block having a particle size greater than 50 millimicrons,
   d. water and
   e. surfactant, wherein said paint is substantially free of silicone and hydrocarbon solvents and has a solids content of from about 20 to about 30 percent.
2. A paint of claim 1 wherein a neutralizing agent is present.
3. A paint of claim 1 wherein an antifoaming agent is present.
4. A method of producing an outside green tire paint which is substantially free of silicon and hydrocarbon solvents, said method comprising: (a) heating a wax to a temperature above the melting temperature of said wax, wherein the wax contains paraffin wax, (b) placing the wax under agitation, (c) adding a fatty acid and an amine to the molten wax, (d) adding a surfactant to the molten wax, (e) adding water wherein said water is preheated to a temperature greater than the melting point of said wax, (f) agitating the mixture while cooling to a temperature near ambient temperature to form a stable wax dispersion, (g) blending with said wax dispersion water, surfactant, nonpelletized carbon black having a particle size greater than 50 millimicrons, and a rubber latex, wherein said latex is selected from the group consisting of natural rubber latex and styrene butadiene latex, to form a stable outside green tire paint having a solids content of from about 20 to about 30 percent.
5. A method of claim 4 wherein a neutralizing agent is blended with the other ingredients.

* * * * *